Oct. 7, 1930.  O. I. CHORMANN  1,777,482
HEATING APPARATUS
Filed May 16, 1928  2 Sheets-Sheet 1

Oct. 7, 1930.  O. I. CHORMANN  1,777,482
HEATING APPARATUS
Filed May 16, 1928  2 Sheets-Sheet 2

INVENTOR
Otto I. Chormann
BY
Crumpston & Griffith
his ATTORNEYS

Patented Oct. 7, 1930

1,777,482

UNITED STATES PATENT OFFICE

OTTO I. CHORMANN, OF ROCHESTER, NEW YORK, ASSIGNOR TO THE PFAUDLER CO., OF ROCHESTER, NEW YORK, A CORPORATION OF NEW YORK

HEATING APPARATUS

Application filed May 16, 1928. Serial No. 278,281.

This invention relates to heating apparatus especially designed for heating the interior of a tank, and is shown in the present embodiment in connection with a milk holding tank of a milk pasteurizing system, although it is obvious that the heating apparatus may be used equally well for various other tanks intended for other purposes.

The principal object of the invention is to provide efficient and satisfactory means for heating the interior of a tank, particularly for heating the space above the level of the liquid, if any, within the tank.

Another object of the invention is to provide heating means for tanks in which the heat is automatically controlled by a device which is responsive to the temperature within the tank, so that the temperature may be kept comparatively constant automatically.

A further object of the invention is to provide simple and effective heating means which can be easily and economically applied to existing tanks as well as to new tanks hereafter built.

It is still a further object of the invention to provide heating means of such a form that it may be kept easily in a clean and sanitary condition, this being especially important where the heating means is to be applied to milk pasteurizing tanks or to tanks containing other substances intended for human consumption.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

It is well understood by those skilled in the art that it is desired at times to hold a liquid within a tank at a predetermined temperature. Often the tank is not completely filled, there being a certain amount of space left in the upper part of the tank above the liquid level. When this occurs, it frequently happens that the air or other gas within this space is cooler than the temperature of the liquid, and the surface layer of liquid therefore tends to cool off. Furthermore, frequently there are more or less froth and bubbles on the top of the liquid, and these are apt to cool off rather rapidly.

If the liquid is undergoing a heat treatment, as is the case in the pasteurization of milk, it follows that the surface layer of the liquid, as well as the froth and bubbles thereon, will not remain for the required time at the required temperature, but will cool off faster than the main body of liquid. Therefore, this froth and bubbles and a certain amount of the liquid near the surface will be incompletely or ineffectively treated, which may lead to serious consequences when the material being treated is intended for human consumption.

To overcome these defects, the present invention provides means for heating the space within the tank above the level of the liquid therein. When this space is kept sufficiently hot, the froth and bubbles on the top of the liquid are kept up to the proper temperature and therefore are completely treated in the desired manner, as is also the surface layer of liquid which would otherwise cool off and be improperly treated.

Figure 1:
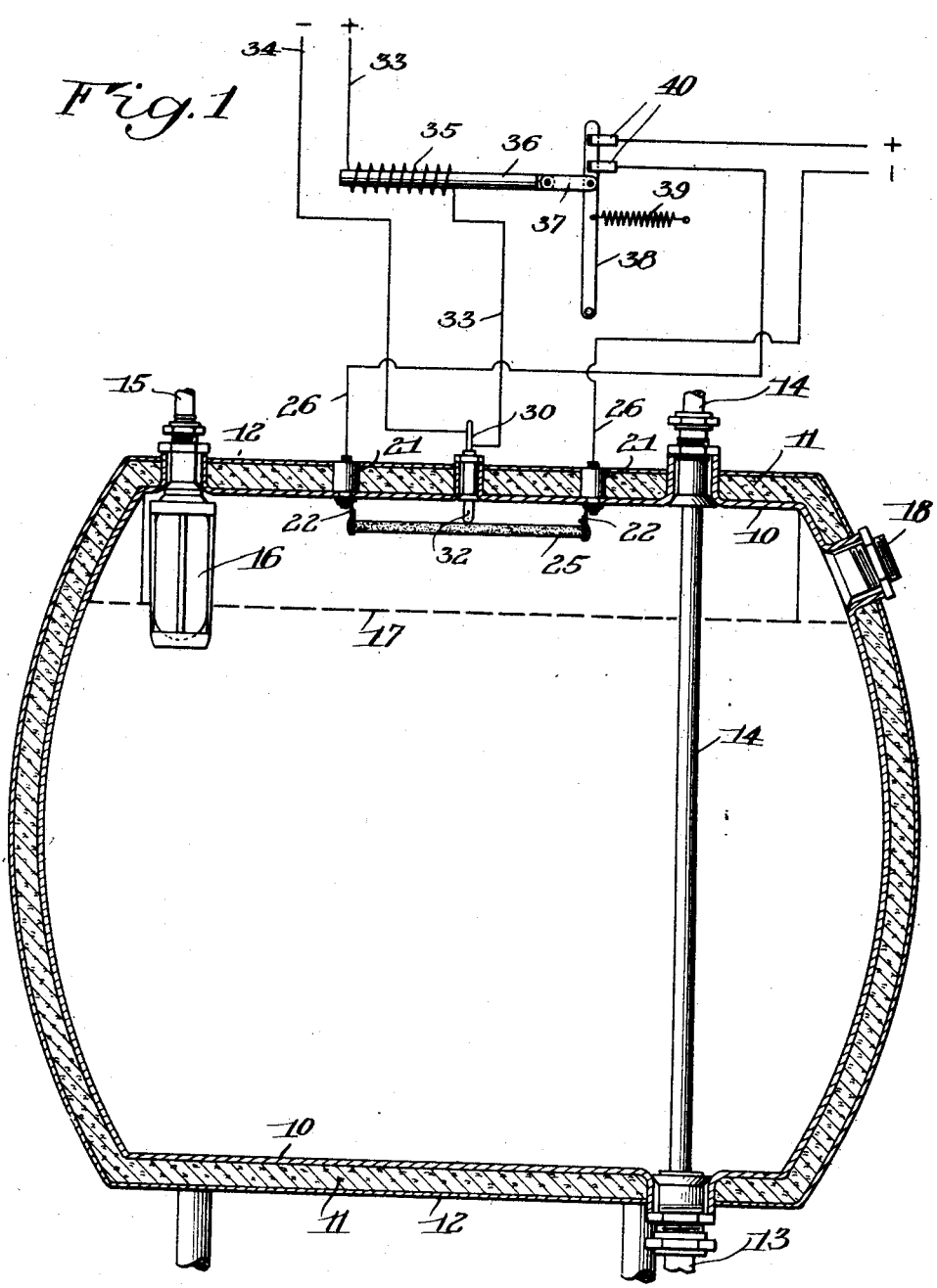
Fig. 1 is a vertical sectional view taken longitudinally through a tank showing an embodiment of the invention applied thereto, and illustrating certain electrical connections and switches diagrammatically.

Referring now to the drawings, Fig. 1 illustrates a tank 10 having an insulating covering 11 confined within an outer shell 12. This tank is adapted to receive any liquid, such as milk, which liquid may be introduced into the tank or withdrawn therefrom in any desired manner. There is here shown an inlet 13 connected to the bottom of the tank and an outlet 14 which extends through the top of the tank and down to a point near the bottom thereof. The tank may be filled and emptied by the use of alternate vacuum and pressure applied through the pipe 15, as will be understood by those skilled in the art. A float valve having a float 16 controls the opening of pipe 15 and thus determines the maximum height to which liquid can be drawn into the tank, this height being indicated by the dash line 17. An observation window or peep hole 18 may be provided so that the operator may see conditions within the tank.

Figure 2:
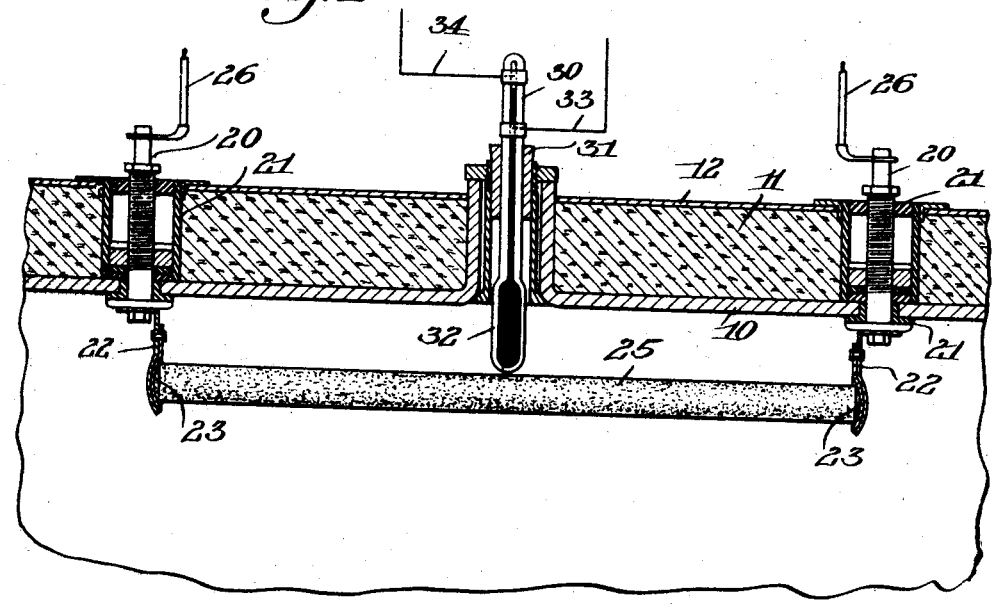
Fig. 2 is a longitudinal vertical sectional view through a part of a tank, illustrating certain details to a larger scale than Fig. 1.
Figure 3:
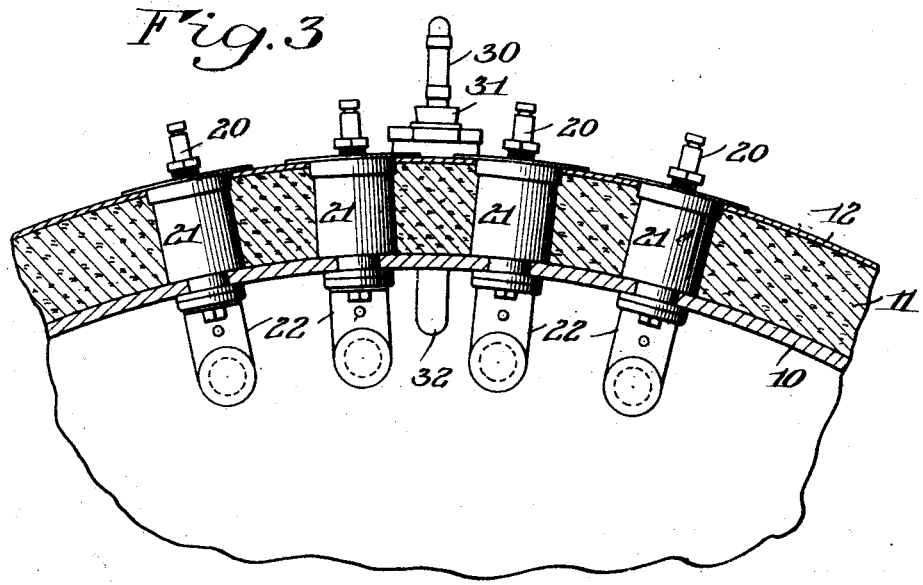
Fig. 3 is a transverse vertical section through a tank showing certain details of the invention.

In the upper part of this tank, above the maximum liquid level 17, heating means is provided. This means is preferably electrical, and may consist of a plurality of heating units, as indicated in Fig. 3. Each of these heating units may be of a form best shown in Fig. 2, in which it will be seen that electrical conductors 20 extend through the top of the tank and are suitably insulated therefrom by non-conducting members 21.

Any suitable electrical heating device may be placed within the tank and connected to the conductors 20 which extend through the wall of the tank. In the embodiment here shown, each of these conductors 20 has a resilient bracket 22 fixed to its lower end, and each of these spring brackets is provided with a concave depression 23 forming a pocket. The open side of the pocket of one of the brackets 22 is arranged to face the open side of the pocket of another bracket, as shown clearly in Fig. 2.

An electrical resistance unit 25 extends from one of the brackets 22 to the other and has its ends received in the pockets 23, so that it is supported thereby, and may be removed and replaced quickly simply by springing the brackets or clips 22 away from each other. This resistance unit may be of any suitable construction which will produce heat as a result of the passage of an electrical current therethrough. Preferably, a non-metallic unit is used, and this may consist, for example, of a rod of carborundum. The brackets 22 are constructed, of course, of electrical conducting material, preferably spring steel, and they form, in effect, continuations of the conductor 20. On account of the spring action, they are constantly held against the ends of the rod 25 and thus form good electrical contacts therewith.

As many heating units as are desired may be placed within the tank. In the embodiment here shown, four units are provided, as illustrated in Fig. 3. Each of the four units is of the construction above described with reference to Fig. 2, the four resistance rods 25 being placed substantially parallel to each other and spaced from each other in the direction of the circumference of the tank. Electrical wires 26 are connected to the conductors 20 which lead through the tank, and these wires are supplied with electrical current from any suitable source of power.

Preferably means is also provided for regulating automatically the temperature within the tank. This means may consist of any heat-responsive device arranged to control the current flowing through the heating elements 25. Such a device is illustrated in Figs. 1 and 2 by way of example only, and it is obvious that a device of any other form for accomplishing the same purpose could be substituted without departing from the invention.

In the embodiment here shown, a thermometer 30 is arranged in an opening through the wall of the tank and is held in the opening by the plug 31. The bulb 32 of the thermometer extends into the tank, while the stem of the thermometer projects outside of the tank as shown. The thermometer is of the mercury type, and has a wire 33 passing through the wall of the tube into the mercury column at one point. A second wire 34 extends through the wall of the thermometer tube somewhat above the wire 33, the position of the inner end of this wire 34 being such that it will contact with the mercury column when the temperature within the tank is at the desired degree, and will be out of contact with the mercury when the temperature is below this desired point.

The wires 33 and 34 are connected to any suitable source of electrical current, and one of the wires, such as 33, has a solenoid 35 formed therein. A core 36, provided with suitable guiding means (not shown) is arranged to slide within the solenoid. This core is connected by a link 37 to a switch lever 38 normally drawn by a spring 39 into position to close the circuit between the contacts 40 to which one of the wires 26 is connected.

It will be apparent from the wiring diagram in Fig. 1 that when the switch 38 is closed, current from the source of supply will flow through the wires 26 to the heating units 25 and will flow through these units, thus producing heat which will warm the interior of the tank. When the temperature within the tank rises to the desired point, the mercury within the thermometer bulb 32 will expand to such an extent that the mercury column in the thermometer tube will come into contact with the end of the wire 34. This will close the circuit between the wires 33 and 34 and will allow current to flow through these wires. The current passing through the solenoid 35 will pull the core 36 leftwardly when viewed as in Fig. 1, and will thus withdraw the switch lever 38 from the contacts 40 to open the circuit 26. This will cut off the current flowing through the heating units 25.

As long as the temperature within the tank remains at the predetermined point or above it, current will continue to flow through the thermostat circuit 33, 34, and the switch 38 will thus be held in open position to keep the heating units cut off. As soon as the temperature within the tank falls below the desired point, the top of the mercury column of the thermometer will recede out of contact with the wire 34. Thus the thermostat circuit 33, 34 will be open and when the current ceases to flow through the solenoid 35, the spring 39 will close the switch 38. This will complete the circuit 26 and allow current to flow once more through the heating units 25, thus warming up the interior of the tank again to the desired point.

It will now be seen that effective mechanism has been devised for heating the interior of the tank. This mechanism is simple in construction and may be applied readily to existing tanks. Since it consists of few parts, it may be kept easily in a clean and sanitary condition, thus avoiding the danger of infecting the supply of milk or other substance being treated.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. The combination with a tank adapted to be partially filled with liquid, of electric means for heating the space within said tank above the liquid level, said means including a pair of electric conductors passing through a wall of said tank at points spaced from each other, each of said conductors having a pocket within said tank, and an electrical resistance element having each end received in one of said pockets and being supported thereby.

2. The combination with a tank adapted to be partially filled with liquid, of electric means for heating the space within said tank above the liquid level, said means including a pair of electrical conductors passing through a wall of said tank at points spaced from each other, each of said conductors having a pocket within said tank, and an electrical resistance element formed of a rod of silicon carbide having each end received in one of said pockets and being supported thereby.

3. The combination with a tank adapted to be partially filled with liquid, of electric means for heating the space within said tank above the liquid level, said means including a pair of electrical conductors passing through a wall of said tank at points spaced from each other, each of said conductors having a pocket within said tank, and an electrical resistance element formed of a rod of silicon carbide having each end received in one of said pockets and being supported thereby, and thermostatic means for controlling the flow of electric current through said conductors and rod.

OTTO I. CHORMANN.